Jan. 5, 1943.  A. C. HOLT  2,307,131
GRAPHICAL ANALYZING DEVICE
Filed Aug. 12, 1941  3 Sheets-Sheet 1

Jan. 5, 1943.  A. C. HOLT  2,307,131
GRAPHICAL ANALYZING DEVICE
Filed Aug. 12, 1941  3 Sheets-Sheet 2

Patented Jan. 5, 1943

2,307,131

UNITED STATES PATENT OFFICE 2,307,131

GRAPHICAL ANALYZING DEVICE

Albert Clyde Holt, Oradell, N. J., assignor to International Business Machines Corporation, New York, N. Y., a corporation of New York Application August 12, 1941, Serial No. 406,521

1 Claim. (Cl. 33—1)

This invention relates to devices for use in dispatching vehicles over a predetermined route having a plurality of stations from which the arrival and departure times of a specific vehicle can reported to one or more dispatching locations in order to anticipate schedule time for arrival at subsequent stations as well as to facilitate the normal progress of the specific vehicle on its current schedule.

In particular this invention relates to a graphical time-space recording device for use in dispatching airplanes over scheduled routes similar to those of the transcontinental airways systems of this country.

A common method for dispatching vehicles used by the railroad, bus, and trucking companies employs dispatchers to whom reports are submitted as to arrival and departure times of variously scheduled trains or vehicles. Entries of such reported times are made upon a so-called dispatcher's report sheet. Since these carriers operate at relatively slow speeds over generally well established routes subject to few unfavorable conditions beyond the carriers' control, their schedules are generally maintained by precedent—a run over the same route by a similar vehicle or train. Dispatching information is largely a matter of safety and selection of right of way and is usually correlated as to time by reference to a visual time recording device or clock not directly associated with the dispatcher's report sheet.

In air transportation, other considerations in dispatching have to be taken into account, however. While weather conditions frequently hamper the schedules of railroad and similar carriers, such interferences rarely throw off the schedule to any great extent and are usually seasonal. In air transportation such occurrences as head winds, storms, fog, and other weather manifestations frequently disrupt the established schedules. It is consequently of importance therefore, in air transportation, to have easily accessible and simple instruments at hand to set up tentative schedules during such interruptions to facilitate the completion of any schedule so affected.

It is accordingly, an object of this invention to provide an improved dispatching device having simple and flexible schedule representing means.

It is another object of this invention to provide a graphical dispatching device from which the schedule status of an aircraft in flight upon a scheduled route can be instantly determined.

It is a further object of this invention to provide a device upon which the dispatching of vehicles can be recorded graphically to predetermine arrival times.

It is a still further object of this invention to provide a dispatching device upon which the progress of a dispatched vehicle can be graphically recorded to determine its approximate location en route at any and all times.

Other objects of the invention will be pointed out in the following description and claim and illustrated in the accompanying drawings, which disclose, by way of example, the principle of the invention and the best mode, which has been contemplated of applying that principle.

Figure 1:
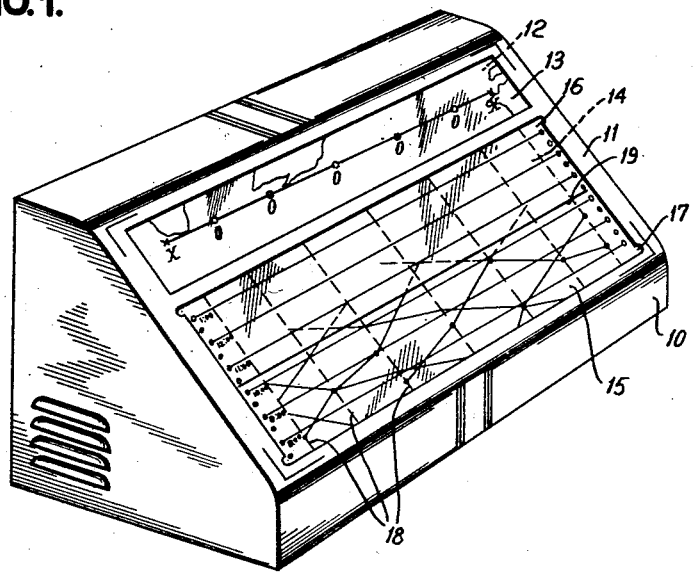
Fig. 1 is a view in perspective of the complete device.

Referring to Fig. 1 a box 10 is provided with a sloping front 11. Two glass panels placed one above the other are inserted into the front 11. The upper panel 12 contains a strip map 13, representing a scheduled transportation route having terminals at points X and intermediate stations at points O. The terminal points X are laid out to a predetermined scale and are jointed by a straight line. The station points O are also laid out to the same scale and lie upon the same line. A line 19, parallel with the line joining the points X, is etched, between the top and bottom edge, upon the lower panel 14. Other lines are also etched upon panel 14 at right angles to line 19 and having their projections passing through each of the points O and X. A length of graph paper 15 is provided to pass over the lower panel 14, emerging from a slot 16 and re-entering through a slot 17.

Figure 2:
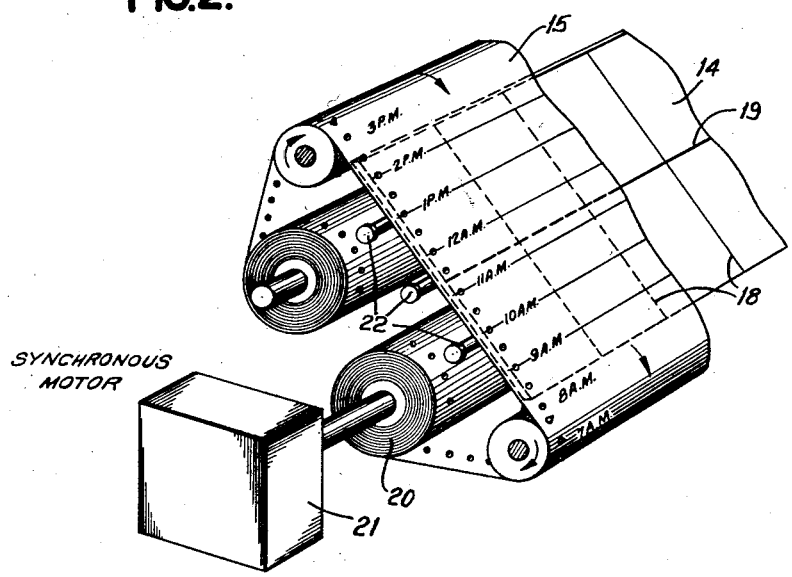
Fig. 2 is a partial perspective view of the simple mechanism of the device and shows the arrangement of the various components.

As shown in Fig. 2, the graph paper 15 is driven by a synchronous motor 21 through a pin drive roll 20 to pass over the face of the panel 14 from top to bottom. This graph paper has ruled upon it lines representing increments of time and designated by letters and numbers corresponding to the hours and minutes of the day. The graph paper 15 is drawn over the panel 14 at a synchronous speed such that the correct time of the day will be indicated by the time increment line coinciding with line 19 at any instant. A bank of tubular incandescent lamps 22 is located directly under the panel 14 to illuminate the lines 18 and the line 19 to be perceptible through the graph paper 15.

Figure 3:
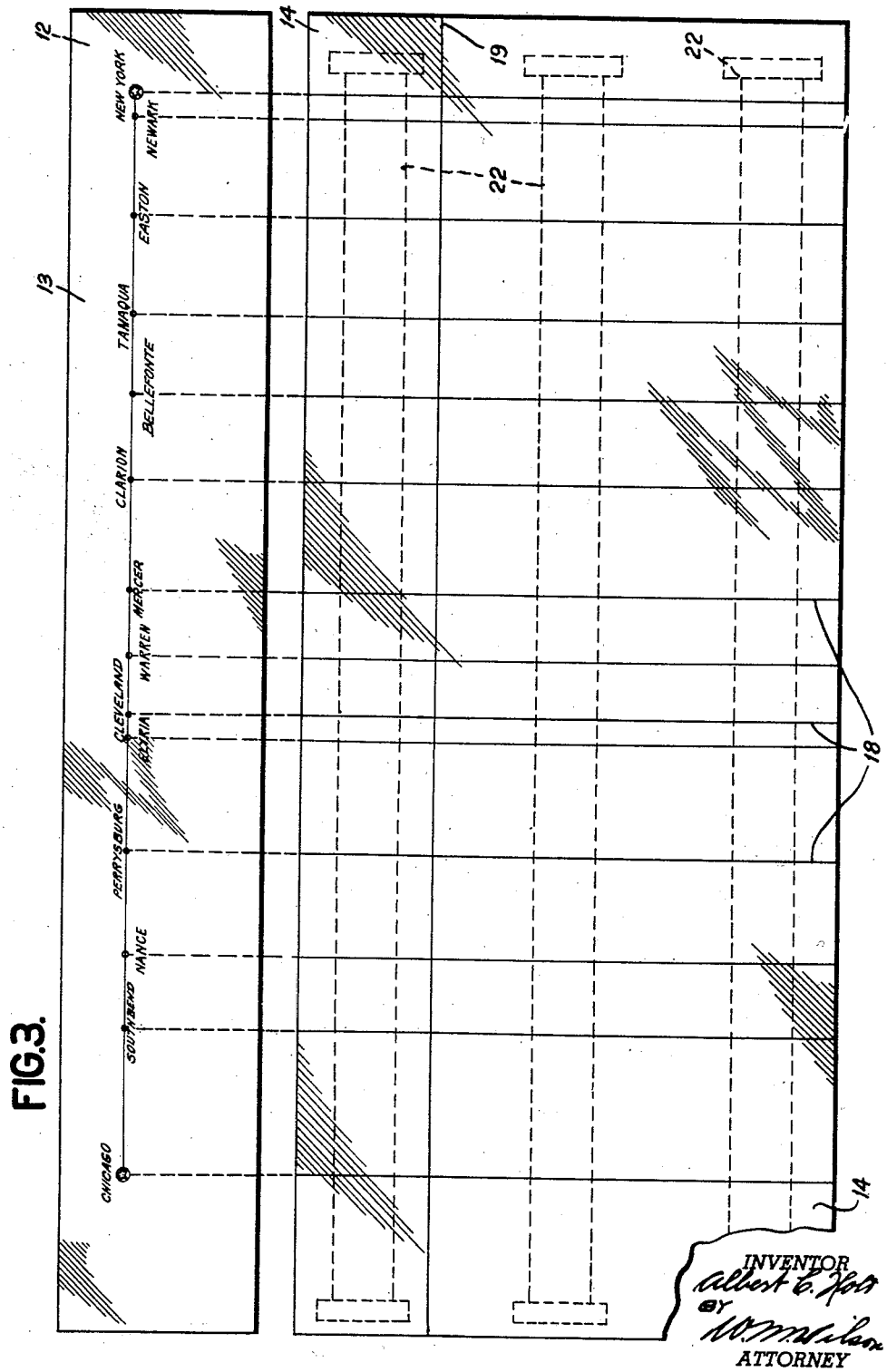
Fig. 3 is a plan view of the panel shown in Fig. 1 with the graph paper removed.

Fig. 3 shows a specific modification of the invention adapted for dispatching aircraft between New York and Chicago, by way of example. A suitable strip map 13 is prepared laying off actual air distances to scale on a line joining the terminals and containing the intermediate stations: Newark, Easton, Tamaqua, Bellefonte, Clarion, Mercer, etc. The map 13 is placed upon the panel 12 and the lines 18 etched upon the panel 14, one line for each station. The time reference line 19 is also etched upon the panel 14, and may be in any position with respect to the top or bottom of the panel, however, always being at right angles to lines 18 and parallel with the line connecting the terminal points on the upper panel 12. The line 19 is generally located about midway between the top and the bottom of panel 14, however, to provide equal amounts of elapsed time and future time below and above the reference line, respectively. A length of suitably indexed graph paper 15 is threaded and fed through the slot 16, and allowed to pass down and over panel 14, re-entering the slot 17 (see Fig. 1). The tubular lamps 22 are lighted and the synchronous motor 21 is energized to pull the graph paper 15 through the device (see Fig. 2) in proper time sequence.

Flight reports are conveyed by wire and radio to the dispatcher operating this device. Upon receipt of such information, the dispatcher plots a point upon the graph paper 15 at the intersection of line 19 and one of the lines 18 corresponding to the station reporting (for example, Newark, see Fig. 4). Later the same aircraft passes over Easton and the time is reported to the dispatcher who again plots a point on the graph paper 15 at the intersection of line 19 and a line 18 corresponding to Easton (see Fig. 4). If a straight line is now drawn between these plotted points it will be seen to have a slope. The vertical component of this slope line will be expressed in time (hours) while the horizontal component will be expressed in distance (miles).

Mathematically, the slope $m$ of any line whose coordinates are $x$ and $y$ may be expressed by:

$$m = \frac{y}{x}$$

This may be written $$\frac{1}{m} = \frac{x}{y}$$

or substituting the components applying in this instance, the reciprocal of the slope is equal to the number of miles per hour. Consequently the slope of the line drawn on graph paper 15 between any two points is an indication of the vehicle's speed between those two points. Furthermore, if this line is projected ahead (upwards) until it crosses a subsequent line 18 corresponding to another station, next to be reported along the route, the intersection of these lines will lie on a time increment line 23 (see Fig. 4) indicative of the time of arrival at the subsequent station, provided the same speed is maintained. In this instance, the greater the slope the lower is the speed, or a vertical slope line may be said to represent zero speed while a horizontal slope line may be said to represent infinite speed.

Since the graph paper 15 is laid off with equally spaced time increment lines passing line 19 with regular intervals corresponding to time intervals, and since the scheduled stations are laid off on the strip map to the same scale, a protractor can be used to read off the speed from the slope of any line. In the upper left-hand corner of the graph paper 15 of Fig. 4 a sample slope line of 200 miles per hour is shown.

Figure 4:
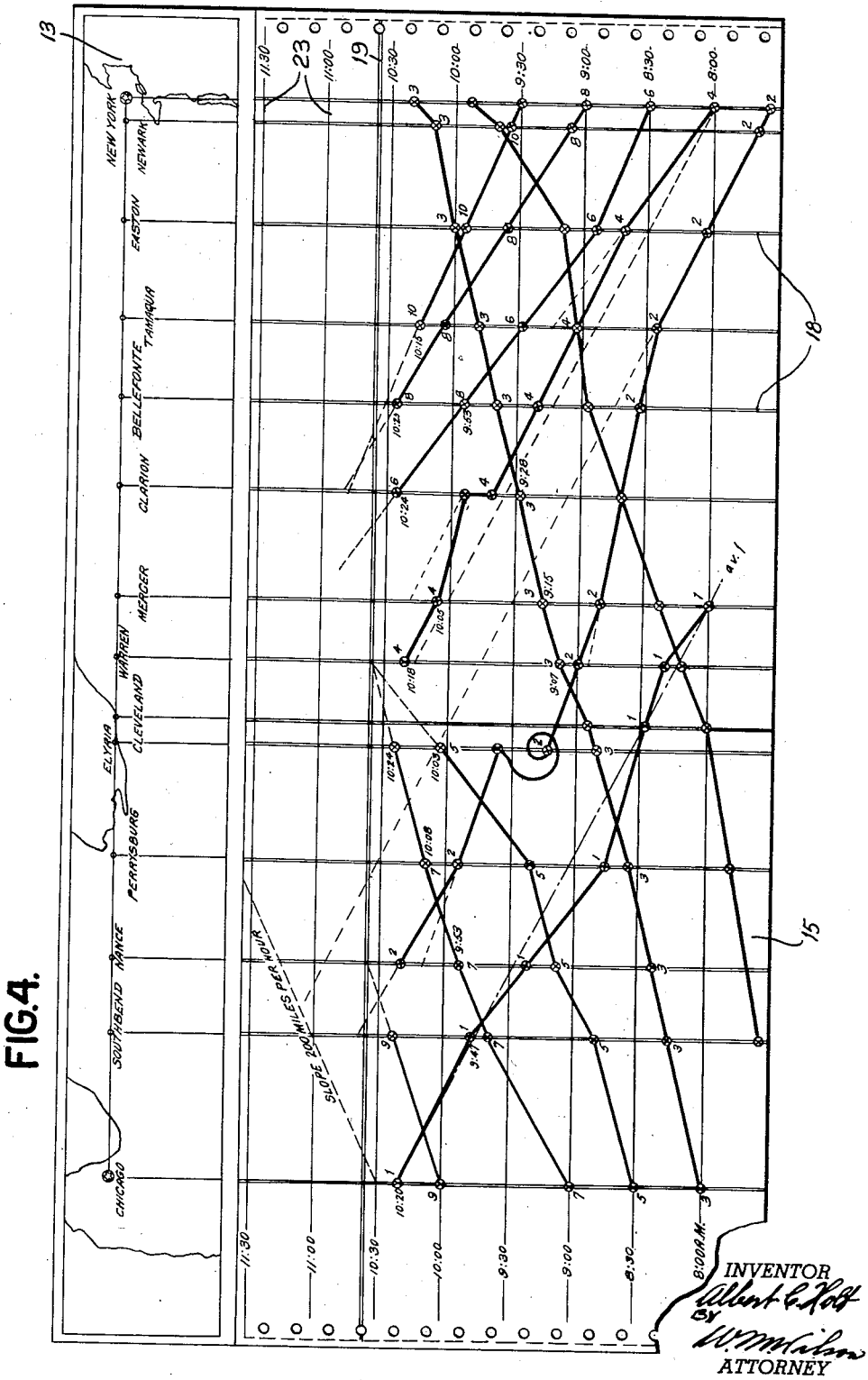
Fig. 4 is a plan view of the panel shown in Fig. 1 with the graph paper in place and the schedules of various vehicles plotted thereon.

Fig. 4 is illustrative of an application of this invention to the dispatching of aircraft over a prearranged course. The terminals of this exemplar course are shown as New York and Chicago, and intermediate points along the route from which reports may be received by the dispatcher are shown as cities along the way. Each individual aircraft or "flight" is numbered and stations from which the flight's progress is reported are indicated by a "cross" inscribed in a "circle."

Upon occasions aircraft may be held up along the scheduled route because of traffic regulations or similar causes. An indication of this sort is shown by "flight 2" at Elyria, the spiral configuration upon the sheet 15 indicating that "flight 2" was not allowed to clear Elyria for a time, represented by the vertical distance between the two points plotted on the Elyria line 18, before receiving the "all clear" signal to continue on to its destination.

"Stopovers" in flight are shown as vertical lines included in the line route of the specific "flight" on the graph sheet 15. For example, "flight 4" arrives at Clarion at 9:38 a. m. and lands, taking off again at 9:53 a. m. During the landing, time on the ground, and the take-off, schedule time is consumed which must be taken into account in determining the average speed for the trip. This is provided for on the graph sheet 15 by the vertical line joining the two points plotted at the times indicated, the length of such line being equal to the time interval of "stopover" (15 minutes).

The normal operation of this device is simple and requires very little study upon the part of the dispatcher using it. When a specific aircraft or "flight" takes off from the initial terminal, the dispatcher plots a point upon the graph sheet 15 at the intersection of the line 18 corresponding to that terminal and the reference line 19. He labels this point with the number of the "flight" and may use a colored pencil. A dotted line is now drawn through the point at a slope corresponding to the scheduled speed of that "flight." This line is continued from time to time to the limits of the exposed graph sheet, as the latter advances, until it finally intersects the line 18 corresponding to the "flight's" final destination. This dotted line represented graphically a perfect scheduled "flight" route. Points of intersection of this dotted line and the various lines 18 represent scheduled arrival times at the corresponding intermediate stations. It is to be noted that in determining the slope of this dotted line, "stopover" times have been considered.

When a report is received from the first intermediate station of the particular "flight" concerned, the dispatcher plots a second point in exactly the same manner as the first plotted point. The dispatcher can tell at a glance from the location of the second plotted point the exact schedule status of the "flight." If this second point lies on the dotted line, the "flight" is on schedule. If this point lies above the dotted line, the "flight" is behind schedule. If this point lies below the dotted line, the "flight" is ahead of schedule. The vertical distance on graph sheet 15 between this point and the dotted line represents the time ahead or behind schedule as measured by the scale of the time increment lines 23.

The dispatcher next draws a solid line between these plotted points and continues such line "dotted" to intersect the immediately following line 18, corresponding to the next intermediate station on the plane's route. The slope of this solid line represents the actual speed made by the particular "flight" over the distance btween the stations corresponding to the lines 18 upon which these points are plotted. The slope might coincide with that of the dotted line in which case the solid line would fall on the first drawn dotted line and the "flight" would obviously be on schedule. Generally, however, the last mentioned lines do not coincide because of conditions affecting the "flight's" speed, as previously recited.

The continuation of the solid line, shown dotted to intersect the following line 18, represents the speed at which the "flight" in question is progressing towards its next station. At any time the horizontal distance, measured along the reference line 19 to the distance scale of the graph sheet, between the line 18 and the intersection of the said continuation of the solid line and the reference line 19, represents the approximate distance between the "flight" and the succeeding station. The point of intersection of the continuation of the solid line and the succeeding line 18 represents the approximate actual arrival time of the "flight" at the station corresponding to the succeeding line 18.

In the manner just described, a dispatcher is enabled to keep a simple accurate check upon the point to point progress of a given "flight," determine its schedule status, and locate its approximate position at any time during such flight.

Fig. 4 shows numerous "flights" as they would appear graphically upon the graph sheet 15 when employing this device. In addition to numbering each "flight" it would be advisable to use a different colored pencil for each. "Flights" numbered 2, 4, 8, and 10 have been completely entered, while for the sake of clarity the other "flights" shown are only partially entered.

"Flight 2" represents a "flight" on schedule to Tamaqua and thereafter considerably ahead of schedule, being detained, without landing, at Elyria to return to nearer the prescribed schedule.

"Flight 4" represents a "flight" typical of the general route schedules maintained. In this example the schedule is maintained reasonably well including the stop at Clarion.

"Flight 8" is a perfect "on schedule" "flight" as in "flight 10." By continuing the actual route lines (solid lines) it is seen that "flight 8" will arrive at Clarion at approximately 10:50 a. m. while "flight 10," traveling at a greater speed, will arrive at the same station at approximately 10:45 a. m. Since "flight 10" was reported later at Tamaqua than "flight 8" it is obvious that the former will overtake and pass the latter at some point east of Clarion indicated by the intersection of the dotted lines pertaining to these "flights" shown on the graph sheet 15. By predetermining such a point the dispatcher is further enabled to carry out his work with increased safety to ascertain that two crossing "flights" are at sufficiently different altitudes to warrant their clearing each other safely.

"Flight 1" is shown in Fig. 4 to illustrate the method for determining the average speed for a complete trip of a given "flight." The average speed of "flight 1" is indicated by the slope of the dot-dash line drawn between its terminals, Mercer and Chicago, as determined by the plotted points for those respective stations.

From the examples set forth, it is apparent that by employing this device a very accurate check can be maintained upon aircraft as they progress along their scheduled routes, speeds of flight can be rapidly estimated and checked from the slopes of the graphical lines drawn, arrival times can be predicted, and the complete dispatching process can be greatly simplified. The device is, furthermore, extremely simple in operation, low in cost because of its simplicity, and effective in its operation.

By way of design of the graph paper 15, the spacing of the lines 23 and the location of the time reference line 19, any reasonable amount of past or future time space may be made available above and below line 19 for use in plotting or interpreting reports received from the various aircraft in flight over the route. Slope-speed protractor lines have to be reconstructed or redrawn each time changes are made in the spacing of time increment lines 23 or when the advance rate of the graph paper 15 is increased or decreased.

While there have been shown and described and pointed out the fundamental novel features of the invention as applied to a single modification it will be understood that various omissions and substitutions and changes in the form and details of the device illustrated and in its operation may be made by those skilled in the art, without departing from the spirit of the invention. It is the intention, therefore, to be limited only as indicated by the scope of the following claim.

What is claimed is:

In a graphing device, a light transmitting panel having parallel distance lines thereon spaced proportionally to the distances between selected points along a route, and a reference line crossing an intermediate portion of the panel at right angles to said distance lines; a translucent graph receiving receiving medium; and means for feeding said medium over said panel at a definite rate; said medium having parallel time representing lines thereon parallel to said reference line and spaced so as to come into register with said reference line at the times they respectively represent.

ALBERT CLYDE HOLT.